US 6,553,136 B1

(12) United States Patent
Keshet et al.

(10) Patent No.: US 6,553,136 B1
(45) Date of Patent: Apr. 22, 2003

(54) SYSTEM AND METHOD FOR COUNTERFEIT PROTECTION

(75) Inventors: Renato Keshet, Haifa (IL); Doron Shaked, Haifa (IL)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/429,515

(22) Filed: Oct. 28, 1999

(51) Int. Cl.[7] .............................. G06K 9/00; G06K 9/62; G06K 9/64
(52) U.S. Cl. .................... 382/135; 382/209; 382/278
(58) Field of Search ..................................... 382/135

(56) References Cited

U.S. PATENT DOCUMENTS

| | | | | |
|---|---|---|---|---|
| 4,208,652 A | * | 6/1980 | Marshall ..................... | 382/135 |
| 4,464,786 A | * | 8/1984 | Nishito et al. ............... | 382/135 |
| 5,363,202 A | | 11/1994 | Udagawa et al. ........... | 358/501 |
| 5,533,144 A | * | 7/1996 | Fan ............................. | 382/135 |
| 5,659,628 A | | 8/1997 | Tachikawa et al. .......... | 382/135 |
| 6,002,807 A | * | 12/1999 | Guerci ........................ | 382/116 |
| 6,067,374 A | * | 5/2000 | Fan et al. .................... | 382/135 |

* cited by examiner

Primary Examiner—Leo Boudreau
Assistant Examiner—Hussein Akhavannik

(57) ABSTRACT

A system and a method for preventing counterfeiting activities utilize an image detection scheme that uses only a few portions of restricted-document images, i.e., templates, to determine whether an input image is a duplicate of a restricted-document image. The image detection scheme can reliably operate at very low resolutions, which allows the use of small kernels for image correlation and reduces the number of pixels that have to be actually processed. The system is designed to be incorporated into a host device, such as a copy machine, a scanner, a personal computer or a printer, to detect a potential counterfeiting activity, so that an appropriate action can be taken to prevent and/or to report the detected activity. The image detection scheme allows the system to operate at an increased detection speed, while minimizing the memory requirement. During an off-line training procedure, a training module of the system derives a parameter file that contains detection descriptors for the restricted-document images, including threshold intervals that are defined using selected kernels and templates of the restricted-document images. The type of kernels and templates selected by the training module can vary, depending on the desired memory requirement and the desired on-line performance. During an on-line detection procedure, a detection module of the system projects portions of the input image and compares the resulting projection value with the threshold intervals to derive template match candidates. The relative coordinates of the template match candidates in the input image are then compared with relative coordinates of the templates in the restricted-document images to determine if the input image matches a particular restricted-document image.

24 Claims, 6 Drawing Sheets

SYSTEM AND METHOD FOR COUNTERFEIT PROTECTION

TECHNICAL FIELD

The invention relates generally to image, processing and more particularly to a system and a method for detecting images of restricted documents for counterfeit protection.

BACKGROUND ART

Counterfeiting of restricted documents, such as monetary bills, is a wide-spread problem throughout the world. Every year, an unknown amount of counterfeit currency is introduced into our society. Historically, production of counterfeit currency required an expert artist to engrave the intricate details of paper money on plates. As such, counterfeiting was limited to a relatively small number of criminals. However, with the advance of color scanning and printing technologies, more people are capable of counterfeiting restricted documents, such as monetary bills, using copy machines and scanners. As copy machines and scanners become more sophisticated and less expensive, a serious threat exists that these machines will be used for counterfeiting purposes by people who might otherwise have had no means to make counterfeit documents.

In response to this threat, image processing systems have been developed that can be incorporated into a copy machine to thwart counterfeiting activities. These image processing systems operate to detect counterfeiting activities by recognizing that a restricted document is being copied using the copy machine. Recognition is accomplished by comparing an entire scanned image with entire images of restricted documents, typically, by performing straightforward linear convolutions. If the scanned image is determined to match one of the restricted-document images, the copy machine is prevented from printing a hard copy of the scanned image. Examples of such image processing systems are described in U.S. Pat. No. 5,363,202 to Udagawa et al. and U.S. Pat. No. 5,659,628 to Tachikawa et al.

A concern with the use of a known image processing system to detect counterfeiting activities is that a large amount of memory space is required to store the images of the restricted images. If the image processing system is to recognize any valid paper money of a designated country, both front and back images of all the paper money for that country would need to be stored in the copy machine in order for the image processing system to make the appropriate comparison between the scanned image and the images of the restricted documents. Although the required images that need to be stored is limited in number, these images are stored in high resolution for reliable image comparison, which takes up sufficient amount of memory. Another concern is that due to the intense processing involved in making the comparisons, the execution time of the image processing for a single scanned image may be too long for any practical implementation.

In light of these concerns, what is needed is a system and a method of detecting counterfeiting activities, with the system and method being efficient with respect to detection speed and memory requirement.

SUMMARY OF THE INVENTION

A system and a method for preventing counterfeiting activities utilize an image detection scheme that uses only a few portions of restricted-document images, i.e., templates, to determine whether an input image is a duplicate of a restricted-document image. The image detection scheme can reliably operate at very low resolutions, which allows the use of small kernels for image correlation and reduces the number of pixels that have to be actually processed. The system is designed to be incorporated into a host device, such as a copy machine, a scanner, a personal computer or a printer, to detect a potential counterfeiting activity, so that an appropriate action can be taken to prevent and/or to report the detected activity. The image detection scheme allows the system to operate at an increased detection speed, while minimizing the memory requirement.

The counterfeit protection system includes a training unit and an image detection unit. The training unit is configured to execute an "off-line" training procedure, during which a parameter file of one or more input restricted-document images is generated. The parameter file contains detection descriptors for the input restricted-document images. During an "on-line" image detection procedure, the image detection unit of the counterfeit detection system utilizes the parameter file to determine whether a given image closely resembles one of the input restricted-document images. In a preferred embodiment, the training unit is a separate unit that is not included in the host device.

The training unit of the counterfeit protection system includes a training module and a storage unit. The storage unit may be a conventional hard disk drive. The training module of the training unit includes a kernel-template selector and a template parameter computer. The kernel-template selector is comprised of a kernel selector and a template selector. The kernel selector is configured to select kernels that are either universal or customized. Similarly, the template selector is configured to extract templates from the input restricted-document images that are either kernel-dependent or kernel-independent. In the preferred mode of operation, universal kernels and kernel-dependent templates are selected to reduce the memory requirement, while also minimizing false alarms. After the kernels and templates have been selected, the template parameter computer projects the templates onto the kernels to derive projection values. The derived projection values are used by the template parameter computer to define a number of intervals that will be used by the image detection unit during the on-line detection procedure. The template parameter computer then stores the defined intervals in the storage unit of the training unit. The defined intervals are included in the parameter file. The parameter file also includes a number of input parameters, the coefficients of the selected kernels, and document parameters.

The image detection unit of the counterfeit protection system includes a detection module and a signaling unit. The detection module of the image detection unit includes a candidate selector and a geometric verifier. The candidate selector is configured to receive an input image and to access the parameter file during an on-line detection procedure. In one embodiment, the counterfeit protection system includes a read-only storage device that may be either replaceable or non-replaceable. In this embodiment, the parameter file generated by the training unit is stored in the read-only storage device. If the read-only storage device is replaceable, the parameter files may be periodically updated by replacing the storage medium utilized by the read-only storage device. However, the counterfeit protection system may be configured to operate without the read-only storage device. In this configuration, the parameter file may be uploaded to a read/writeable memory of the image detection unit from an external source, such as the Internet.

The candidate selector of the image detection unit is comprised of a linear match filter and a thresholder. The linear match filter is designed to project portions of the input image onto the kernels that were selected during the off-line training procedure. The resulting projection values are then compared using the defined intervals of the parameter file by the thresholder. Portions of the input image that satisfy the comparison for all intervals are declared template match candidates. Coordinates of these template match candidates, as well as corresponding restricted-document image indices, template numbers and estimated orientation angle intervals, are transmitted to the geometric verifier. The geometric verifier is configured to compare the relative coordinates of the template match candidates in the input image with the relative coordinates of the templates in the input restricted-document images to determine whether the input image is a duplicate of a restricted-document image. If the relative positions of the template match candidates are similar to those of the templates in a restricted-document image, the input image is determined to be a duplicate of that restricted-document image, i.e., the input image matches the restricted-document image.

The signaling unit of the image detection unit is configured to transmit a signal in response to a positive determination that the input image matches a restricted-document image. Depending on the host device embodying the system, the signaling unit may transmit the signal to a component of the host device, so that the component can execute one or more of the following responsive operations: prevent the host device from printing the input image; direct the host device to print an altered version of the image; direct the host device to mark the printed image (e.g., a superimposed "X" mark across the image); record in the storage unit or other storage medium that a counterfeiting attempt has been made; and transmit the counterfeiting attempt information to a designated security site.

DETAILED DESCRIPTION

Figure 1:
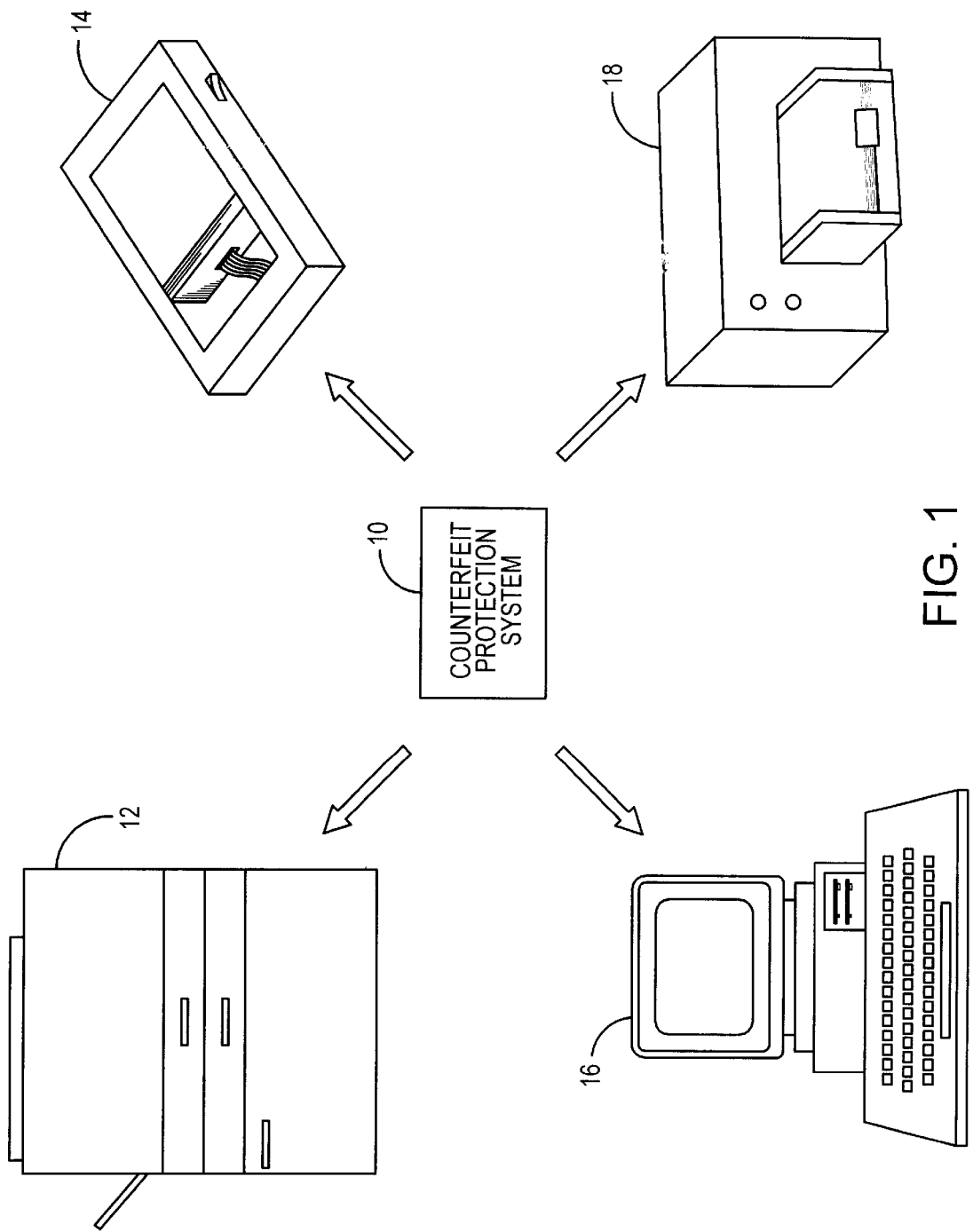
FIG. 1 is a block diagram of a counterfeit protection system in accordance with the present invention that can be embodied in different host devices.

With reference to FIG. 1, a counterfeit protection system 10 in accordance with the present invention is shown. As illustrated in FIG. 1, the counterfeit protection system can be incorporated in a number of host devices, such as a copy machine 12, a scanner 14, a personal computer 16 and a printer 18. The counterfeit protection system can be implemented in hardware and/or software to detect images of restricted documents that may be generated, received, transmitted or manipulated by the host device that embodies the counterfeit protection system. The restricted documents may be monetary bills, stock certificates, checks, bank notes, and other valuable papers. The counterfeit protection system operates to detect a potential counterfeiting activity, so that an appropriate action can be taken in response to the detected activity.

Figure 2:
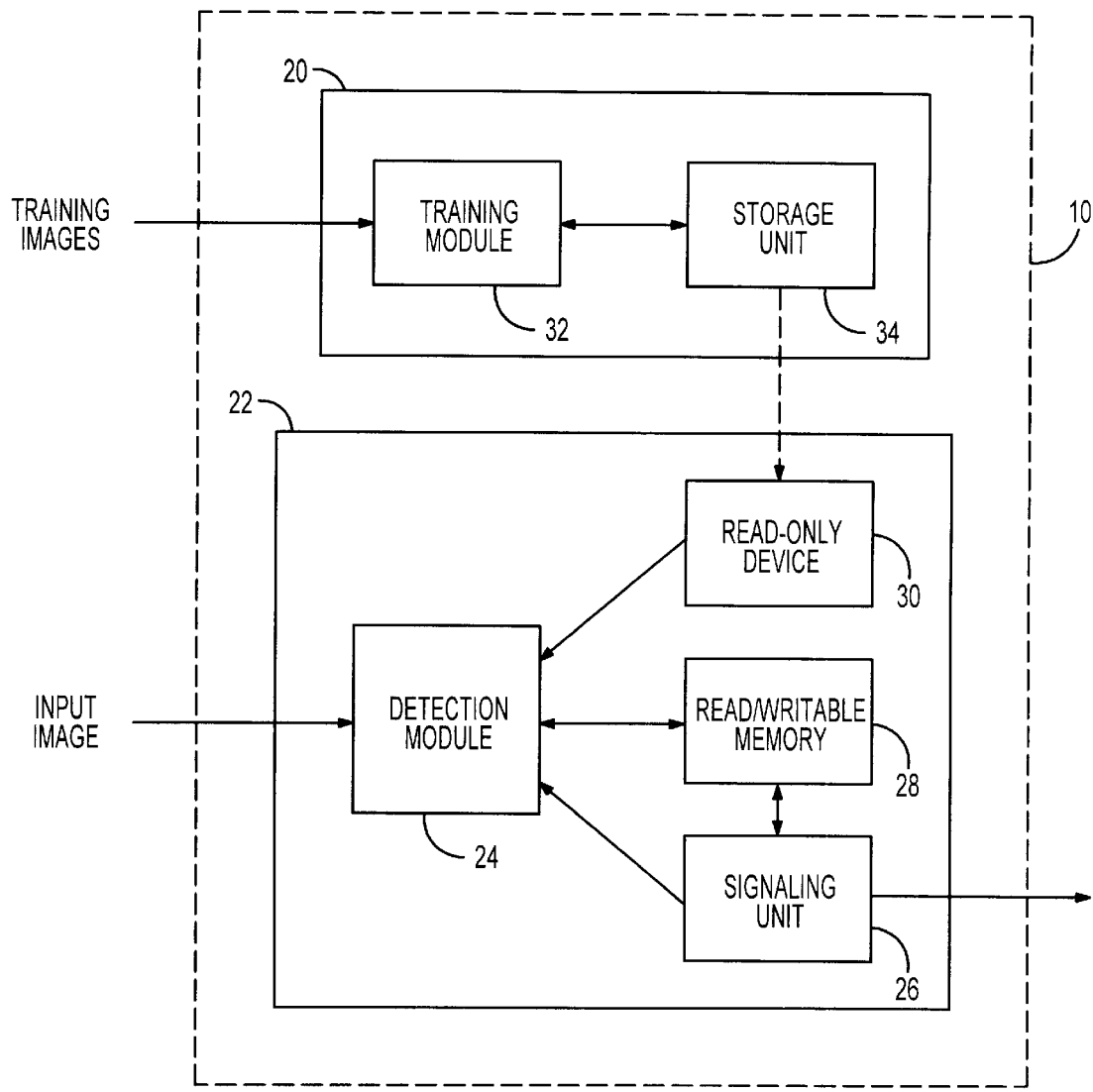
FIG. 2 is a block diagram of the components of the counterfeit protection system of FIG. 1.

Referring now to FIG. 2, the counterfeit protection system 10 includes a training unit 20 and an image detection unit 22. The training unit is configured to execute an "off-line" training procedure to generate a parameter file of one or more input restricted-document images. The parameter file contains detection descriptors for the restricted-document images. This parameter file is then utilized by the image detection unit of the counterfeit protection system to determine whether a given image closely resembles a restricted-document image by comparing image information of the given image with the information included in the parameter file, during an "on-line" image detection procedure. In a preferred embodiment, the training unit is an independent apparatus that is not included in the host device. In this embodiment, the training unit may be a personal computer or workstation, in which the processing functions of the training unit are executed by the CPU of the computer/workstation using a customized software.

The image detection unit 22 of the counterfeit protection system 10 includes a detection module 24, a signaling unit 26, a read/writeable memory 28 and a read-only device 30. The detection module executes the on-line image detection procedure to determine whether the given image is a duplicate of a restricted-document image. The on-line image detection procedure involves processing an input image, e.g., a scanned image, using the parameter file generated by the training unit 20 of the system to return a determination as to whether the input image is an image of a restricted document.

The signaling unit 26 of the image detection unit 22 is configured to transmit a signal in response to a positive determination by the detection module 24 that the input image is an image of a restricted document. Depending on the host device embodying the counterfeit protection system 10, the signaling unit may transmit the signal to a component of the host device, so that the component can execute one or more of the following responsive operations: prevent the host device from printing the input image; direct the host device to print an altered version of the image; direct the host device to mark the printed image (e.g., a superimposed "X" mark across the image); record in the storage unit or other storage medium that a counterfeiting attempt has been made; and transmit the counterfeiting attempt information to a designated security site.

The read/writeable memory 28 of the image detection unit 22 may be a conventional hard drive that is commonly found in a personal computer. In a preferred configuration, the image detection unit may utilize an external storage unit included in the host device embodying the counterfeit protection system 10, thereby eliminating the need for the read/writeable memory in the image detection unit. The read-only storage device 30 of the image detection unit 22 may be any non-volatile/read-only memory device that is accessible by the detection module 24. The read-only storage device is used to store the parameter file, so that the parameter file cannot be easily modified by the user of the host device. The read-only storage device may be a non-replaceable unit, such as a read-only-memory (ROM) chip. Alternatively, the read-only storage device may be a replaceable unit, such as a removable storage device that utilizes a read-only data storage medium, e.g., a CD-ROM disk or a DVD. However, the image detection unit of the counterfeit protection system may be configured to operate without the read-only storage device. In this configuration, the parameter file may be uploaded to the read/writeable memory from an external source, such as the Internet. In all the above cases, it is assumed that the host device will not operate unless the counterfeit protection system can access a valid/updated parameter file.

Figure 3:
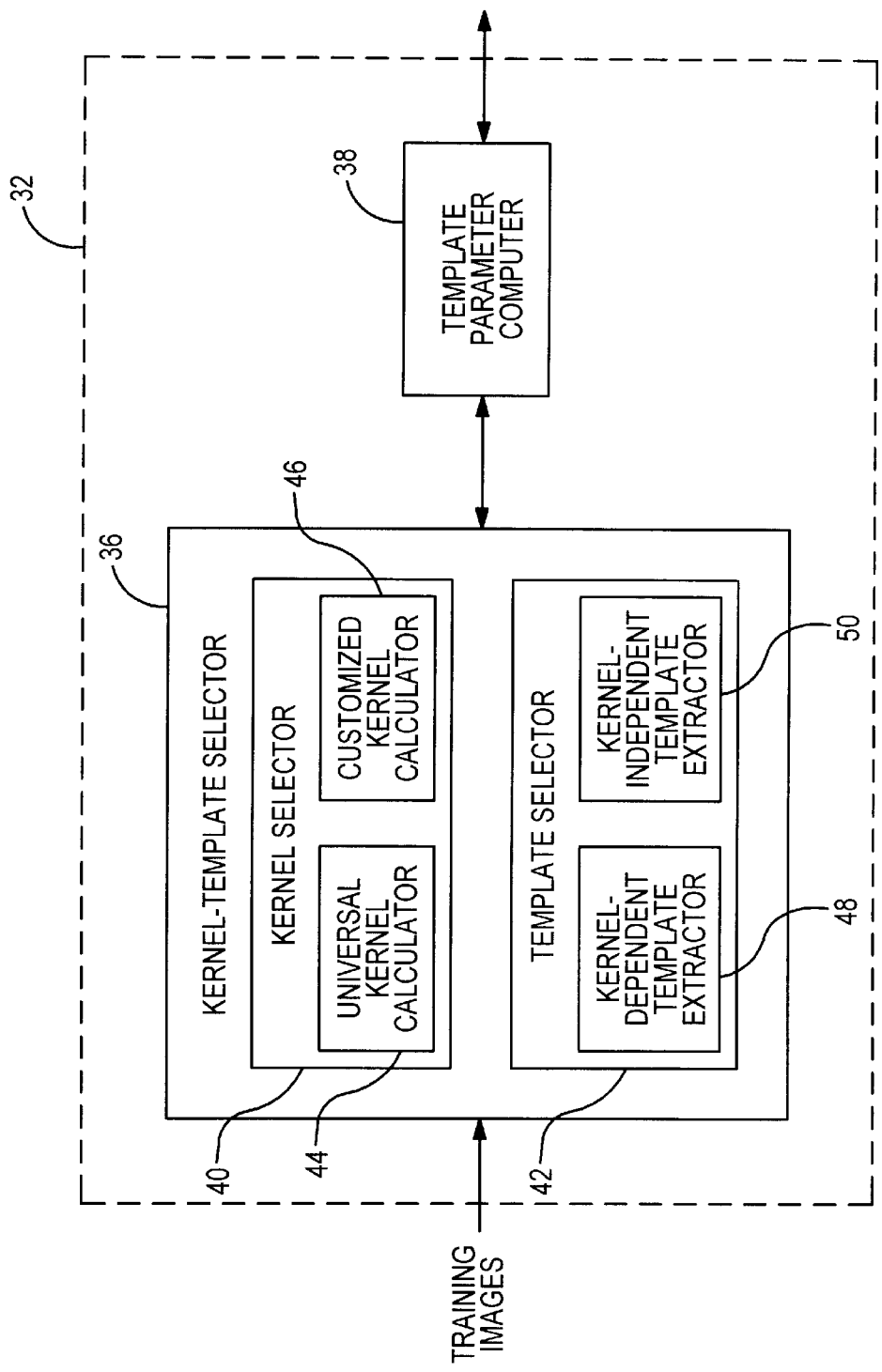
FIG. 3 is a block diagram of the components of a training module included in the counterfeit protection system of FIG. 1.

As illustrate in FIG. 2, the training unit 20 of the counterfeit protection system 10 includes a training module 32 and a storage unit 34. Similar to the read/writeable memory 28 of the image detection unit 22, the storage unit may be a conventional hard drive. The training module of the training unit is configured to compute the parameter file from one or more input restricted-document images. The components of the training module 32 are illustrated in FIG. 3. The training module includes a kernel-template selector 36 and a template parameter computer 38. The kernel-template selector is comprised of a kernel selector 40 and a template selector 42. As their names suggest, the kernel selector operates to select a number of kernels (defined below), while the template selector operates to select a number of templates (defined below). The kernel-template selector utilizes a number of input parameters that may be stored in the storage unit 34 of the training unit 20. Exemplary input parameters are listed in the following table.

| Parameter | Description | Preferred value |
|---|---|---|
| I | The number of restricted-document images. | ≤15 |
| $R_0$ | Resolution of the input image. | 50 dpi |
| L | The number of templates per image. | 6 |
| N | Kernel size. | 7 |
| R | Decimation rate. | 7 |
| $K_{iso}$ | The number of isotropic kernels. | 2 |
| $K_{non}$ | The number of non-isotropic kernels. | 2 |
| C | The number of colors. | 3 |
| $S_t$ | Template selection type. | kernel-dependent |
| $S_k$ | Kernel selection type. | universal |
| $F_M$ | Local-maximum flag. | On |
| $F_N$ | Normalization flag. | On |
| $L_e$ | Number of essential templates. | 5 |

Templates are circular extracts from input restricted-document images. The input restricted-document images are images of restricted documents that are to be considered by the system 10 in order to prevent counterfeiting activities. The number of templates selected per restricted-document image by the template selector 42 is defined by the input parameter L. The diameter of the template in pixels is given approximately by the product N·R, where N and R are input parameters. Because the values N and R are fixed, a template is uniquely characterized by the position of its center within the restricted-document image. The templates are required to be totally contained within the image, therefore the locus of their centers is an eroded version of the image domain. Specifically, if the image lies in an a×b rectangle, than the center locus is a concentric (a−NR)×(b−NR) rectangle. This center locus is denoted here as a search window. For practical reasons, the search window can be defined as a concentric (a−√2NR)×(b−√2NR) rectangle. This is to permit the calculation of rotated versions of the decimated templates during the calculation of template parameters, which is executed by the template parameter computer 38.

The kernels are N×N-pixel images that are used for linear convolution with an input image that is to be examined during the on-line procedure, so as to determine whether the input image is a duplicate of a restricted-document image. The results of such convolutions are analyzed by the detection module 24 of the image detection unit 22 during the on-line image detection procedure. It is preferable that each kernel be as close to a circle as possible. There are two types of kernels: isotropic and non-isotropic. The number of isotropic and non-isotropic kernels are determined by the input parameters $K_{iso}$ and $K_{non}$, respectively. Ideally, the isotropic kernels are 2D real functions that do not depend on the orientation angle, i.e., they are composed of concentric rings. Since sampled functions are utilized to derive the kernels, as will be described below, the isotropic kernels are considered an approximation of the above ideal concept. The main desired property of these isotropic kernels is that, when projecting (by means of inner product) all rotated versions of a given circular image on an isotropic kernel, the result is constant (i.e., does not depend on the rotation angle). As used in this system 10, non-isotropic kernels are complex kernels satisfying the following properties: (a) the absolute value of the inner product between the non-isotropic kernel and a rotated version of a given circular image does not depend on the rotation angle (generalization of the isotropic property); and (b) the phase of the above inner product is equal to a multiple of the rotation angle plus a constant. Calculation of isotropic and non-isotropic kernels will be described below with reference to the kernel selector 34.

The kernel selector 40 of the kernel-template selector 36 may be configured to select either universal or customized kernels, depending on the input parameter $S_k$. Universal kernels refer to kernels that do not depend on the templates, whereas customized kernels are selected as a function of the selected templates. When the input parameter $S_k$ is set to "universal kernel," a universal kernel calculator 44 of the kernel selector operates to select the universal kernel. When the input parameter $S_k$ is set to "customized kernel," a customized kernel calculator 46 of the kernel selector operates to select the customized kernel. Similarly, the template selector 42 of the kernel-template selector may be configured to select either kernel-dependent or kernel-independent templates, depending on the input parameter $S_t$. Depending on the input parameter $S_t$, a kernel-dependent template extractor 48 or a kernel-independent template extractor 50 of the template selector operates to select the desired kernels.

The order in which the kernel and template selection operations are executed by the kernel and template selectors 40 and 42 depends on which kernel calculator 44 or 46 and which template extractor 48 or 50 will select the kernels and templates. The following table describes the possible orders of the kernel and template selection operations for different configurations of the kernel and template selectors.

| | Universal kernels | Customized kernels |
|---|---|---|
| Kernel-dependent templates | Kernel selection first | Alternate template and kernel selection steps |
| Kernel-independent templates | The order of steps does not matter | Template selection first |

In the preferred mode of operation, the kernel and template selectors 40 and 42 are configured to select universal kernels and the kernel-dependent templates. The rationale is that the use of universal kernels saves memory (the same set of kernels is used for all the templates), whereas kernel-dependent templates are more efficient to detect than kernel-independent ones (which minimizes false alarms). However, if memory is not an issue, configuring the kernel and template selection module such that customized kernels are used, either with kernel-dependent or kernel-independent templates, may be preferred.

Described below are the universal and the customized kernel selection procedures that are executed by the universal kernel calculator 44 and the customized kernel calculator 46, respectively, of the kernel selector 40. The kernel selection procedures are then followed by a few simple procedures for kernel-independent template selection and a procedure for kernel-dependent template selection that are executed by the kernel-dependent template extractor 48 and the kernel-independent extractor 50, respectively.

A procedure for customized kernel selection that is executed by the customized kernel calculator 46 of the kernel selector 40 will be described first as if the templates and kernels are continuous images. Given a template $m(\rho, \theta)$, the values of $\hat{m}_k(\rho)$ for all non-negative integer values of k, where $k \in Z$, and for all values of $\rho$, ranging from 0 to the radius of the template, are calculated using the following equation.

$$\hat{m}_k(\rho) \triangleq \frac{1}{2\pi} \int_{-\pi}^{\pi} m(\rho, \theta) e^{-jk\theta} d\theta, \tag{1}$$

This step is actually a Fourier transform. However, this step is not a 2D transform, but rather a series of 1D transforms, each regarding a fixed value of $\rho$, i.e., each corresponds to a different "ring" within the template. Next, eigen-values $\lambda_k$ are calculated for all the non-negative integers k using the equation:

$$\lambda_k \triangleq \frac{1}{2\pi} \int_0^\infty |\hat{m}_k(\rho)|^2 d\rho. \tag{2}$$

The derived eigen-values $\lambda_k$ are the eigen-values for the family of rotations of the template m. The result, $\lambda_k$, k=0, 1, ..., is a 1D function of k, where $\lambda_k$ is non-negative for all k.

The eigen-vectors $\phi_k(\rho, \theta)$ with the highest eigen-values are the set of kernels that, on the average, best approximate any member of the family of rotations of m. Moreover, they enjoy the following property, for any $\eta$:

$$|x(\rho, \theta-\eta) \cdot \phi_k(\rho, \theta)| = \alpha_k, \tag{3}$$

where $x(\rho, \theta)$ is any given image, and $\alpha_k$ is a constant that does not depend on $\eta$. In other words, the absolute value of the projection of x on the kernels does not depend on the orientation $\eta$ of x. Obviously, this is true also for x=m. In addition, the following equation holds:

$$\text{phase}\{x(\rho, \theta-\eta) \cdot \phi_k(\rho, \theta)\} = (\beta_k + k\eta), \tag{4}$$

where $\beta_k$ depends on k only.

Properties (3) and (4) correspond to the two properties required by isotropic and non-isotropic kernels, as described above. When x=m, $\alpha_k = \lambda_k$, and this is the highest among the values for all possible projection kernels. This is a known property of the eigen-vectors with the highest eigen-values.

After the eigen-values $\lambda_k$ have been calculated, the values of k that correspond to the $k_{non+1}$ highest eigen-values are selected. Usually, this includes k=0. However, if k=0 is not included, k=0 is selected and the values of k corresponding to the $k_{non}$ highest values of $\lambda_k$ are selected. For all values of k in the selected set, eigen-vectors $\phi_k(\rho, \theta)$ are computed using the following equation.

$$\phi_k(\rho, \theta) = \hat{m}_k^*(\rho) \omega_k(\theta), \tag{5}$$

where $$\omega_k(\theta) \triangleq e^{-jk\theta}. \tag{6}$$

Each computed eigen-vector $\phi_k(\rho, \theta)$ is an image. For each value of k (not including zero), this eigen-vector is a complex image, i.e., it has a real and an imaginary part. In other words, the eigen-vector comprises two images, one corresponding to the real part and the other to the imaginary part. For k=0, the imaginary part is null, and consequently, the corresponding eigen-vector includes only one real image. The eigen-value corresponding to k=0 is an isotropic kernel. The eigen-values corresponding to the other values of k are non-isotropic kernels.

In practice, the variables $\rho$ and $\theta$ are discrete, and discrete versions of the above equations should be used. In this case, the number of eigen-values other than zero is finite, and usually on the order of the number of possible values of $\theta$. In addition, the kernels should be decimated (down-scaled) with rate R:1, determined by the input parameter R.

In summary, the procedure for customized kernel selection involves initially calculating all the non-zero eigen-values $\lambda_k$ to derive the customized kernels. The eigen-vectors $\phi_k$ corresponding to k=0 and the other $K_{non}$ highest eigen-values are then computed. These eigen-vectors are decimated by R, resulting in the customized kernels.

A procedure for universal kernel selection that is executed by the universal kernel calculator 44 of the kernel selector 40 utilizes the following observations to derive universal kernels. In equation (5), the eigen-vectors are separable functions, where the angular components $\omega_k(\theta)$ are complex Fourier kernels and do not depend on the template. Universal non-isotropic kernels can be obtained by considering only the angular components of these eigen-vectors. Isotropic kernels can be obtained by calculating any function depending only the radius $\rho$.

The universal kernel selection procedure is as follows. Initially, let the kernels be circular images of radius $\rho_{max} \triangleq (NR)/2$ pixels. Then, construct the following isotropic kernel:

$$\varphi_k(\rho, \theta) = \cos\left(\frac{2\pi k}{\rho_{max}} \rho\right), \tag{7}$$

for k=0, ..., $K_{iso}-1$, and the following non-isotropic kernels:

$$\phi_k(\rho, \theta) = e^{-j(k-K_{iso}+1)\theta}, \tag{8}$$

where k=$K_{iso}$, ..., K-1, with $K \triangleq K_{iso} + K_{non}$. Finally, downscale these kernels by R, obtaining approximately circular kernels within a N×N-pixel window.

A procedure for kernel-independent template selection that is executed by the kernel-independent template extractor 50 of the template selector 42 may involve randomly selecting points within the search window, which is defined above, of an input-restricted document image. The procedure may, instead, involve manually selecting points within the search window. Alternatively, the procedure may involve automatically selecting equally-spaced points within the search window.

A procedure for kernel-dependent template selection that is executed by the kernel-dependent template extractor 48 of the template selector 42 assumes that a set of isotropic and non-isotropic kernels $\phi_k$, k=1, ..., K−1 have been previously selected. It also assumes L≧2. The following C-like pseudo-code describes the kernel-dependent template selection procedure.

```
τ = select_template(restricted_documents_images,kernels,
input_parameters) {
    for (i = 1, i ≦ 1,i++) {/*For each restricted-document image */
        Let τ_i be the list of templates for image i. Initially, τ_i is empty;
        (e_1, e_R) = calculate_energy_images(image i,kernels);
        /* (calculate_energy_images( ) is shown below).
        /*e_1 is the energy image in the input resolution R_0,
        /* and e_R is in the downscaled resolution R_0/R. */
        if (F_M)
            Find local maxima of e_R inside the search window.
            Call them s_n, n = 1, . . . , M_g;
        else
            Mark all points in search window as local maxima (s_n);
        Initialize τ_i with the best part of local maxima (s_n0, s_n1)
            selected according to the criterion:

[e_R(s_n0) + W·e_R(s_n1)]·dist(s_n0, s_n1) ⎯⎯⎯→ max,
                                                       n0,n1 where dist( ) is the Euclidean distance,
        and W is a weighting constant (e.g., W = 0.8).
        for (l = 3, l ≦ L,l++) {
            Add s_nl to τ_i, satisfying:

e_R(s_nl)·D(S_nl) ⎯⎯→ max,
                               nl where:
            D(s_nl) ≜ min_{s∈τ_i} dist(s, s_nl).
        }
        Replace each selected template point in τ_i by
            local maximum of the corresponding neighborhood in e_1;
            /* I.e., return templates in the original resolution R_0;
            /* instead of the downscaled resolution R_0/R. */
        }
    }
}
```

The above template selection algorithm includes a routine for calculating the energy images and a routine for calculating the downscaled image versions. Both routines are described in the following C-like pseudo-codes.

```
(θ_I,θ_R) = calculate_energy_images (x, kernels) {
    h ← Height of x; w ← Width of x;
    K ← K_iso + K_non;
    θ_I ← A null image with the size h × w.
    θ_R ← A null image with the size ⌊h/R⌋ × ⌊w/R⌋.
    {X_p,q}← calculate_downscaled_versions (x, R);
        /*Described below.
        /*Produces R × R versions of x, downscaled R:1. */
    for (k = 1;k < K;k++) {
        φ_k ← φ_k/|φ_k|;/*Normalize kernel.*/
        for (p = 0; p < R; p++)
        for (q = 0; q < R; q++)
            for (c = 0; c < C; c++) {
                e_k^(c) ← The color plane c of x_p,q, filtered by φ̂_k.
                for (m = 0; m < h;m++)
                for (n = 0; n < w;n++) {
                    θ_R (m,n) += [e_k^(c)(m,n)]^2;
                    θ_I(Rm + p, Rn + q) += [θ_k^(c)(m,n)]^2;
}}}}
    {x_pj} = calculate_downscaled_versions (x, R) {
        h ← Height of x; w ← Width of x;
        x̂ ← x filtered by a R × R flat averaging filter.
        for (p = 0; p < R;p++)
        for (q = 0; q < R;q++)
        for (m = 0; m < h;m++)
```

-continued
```
            for (n = 0; n < w;n++)
                x_p,q(m,n) ← x̂ (Rm + p, Rn + q);I*
            Sample filtered image on a R × R
            grid, starting at pixel (p,q). *I
```

The idea of the kernel-dependent template selection procedure is to select the templates having the highest energy on the subspace defined by the isotropic and non-isotropic kernels $\phi_k$, k=1, ..., K−1, and being as far apart from each other as possible. If the input parameter $F_M$ (Local-maximum flag) is "on," then the templates are also required to be local maxima of the above energy function within the corresponding restricted-document image.

After the kernel selector 40 and the template selector 42 of the kernel-template selector 36 have calculated the appropriate kernels and templates, the selected kernels and templates are transmitted to the template parameter computer 38. The template parameter computer operates to produce template parameters, which consist of a set of intervals that will serve as thresholds for the convolution operations performed during the on-line image detection procedure.

The input value $F_N$ (normalization flag) determines if the intervals are absolute or normalized. Absolute intervals are more selective than normalized ones, but are very color dependent. That is, if the colors of the restricted-documents are significantly different in the input scanned image (assuming that the system is embodied in a scanner or a copier) as compared to the training scanned image, then mis-detection is more likely to occur. Normalized-intervals is the preferred mode, which causes the system 10 to be fairly scanner independent. On the other hand, if the system is to be used assuming a fixed scanner or copier model, for both the training procedure and the image detection procedure, then the absolute-interval mode may be utilized, which is expected to reduce false alarm rates since the use of absolute intervals is more sensitive. Furthermore, the utilization of the absolute-interval mode is expected to lead to a faster implementation during an on-line image detection procedure.

The set of intervals is produced by the following process, which is executed by the template parameter computer 38.

(1) T rotated versions of each template, of each restricted-document image, are initially produced. Each rotated image t=0, ..., T−1 consists of the corresponding template, rotated by an angle of 360t/T degrees. The preferred value of T is 64.

(2) R×R downscaled versions of each rotated version, of each template, is then produced, using the routine "calculate_downscaled_version( )," described above in the C-like pseudo-code for calculating the downscaled image version. The same routine used in the kernel-dependent template selection procedure is used here to calculate the template parameters.

(3) Each C color plane of each $T \cdot R^2$ rotated/downscaled version of each $I \cdot L$ template is projected (by inner product) on each $K=K_{iso}+K_{non}$ kernel. The result is $I \cdot L \cdot C \cdot T \cdot R^2 \cdot K$ values v(i, l, c, t, p, q, k), where i=0, ..., I−1, l=0, ..., L, c=0, ..., C−1, t=0, ..., T−1, p, q+0, ..., R−1, and k=0, ..., K−1.

(4) For each of the I·L templates, the following parameters are calculated:

(a) Only if $F_N$ is on, the K·T·R$^2$ intensity values $\chi(i, l, k, t, p, q)$:

$$\chi(i, l, k, t, p, q) \triangleq \sum_c |v(i, l, c, t, p, q, k)|. \quad (9)$$

(b) Only if $F_N$ is on, the K intensity intervals $[\chi_{min}(i, l, k), \chi_{max}(i, l, k)]$:

$$\chi_{min}(i, l, k) \triangleq \min_{t,p,q} \chi(i, l, k, t, p, q), \quad (10)$$

$$\chi_{max}(i, l, k) \triangleq \max_{t,p,q} \chi(i, l, k, t, p, q). \quad (11)$$

(c) The K·C color intervals $[A_{min}(i, l, c, k), A_{max}(i, l, c, k)]$, given by:

$$A_{min}(i, l, k, c) \triangleq \begin{cases} \min_{t,p,q} \frac{|v(i, l, c, t, p, q, k)|}{\chi(i, l, k, t, p, q)}, & \text{if } F_N \text{ is on} \\ \min_{t,p,q} |v(i, l, c, t, p, q, k)|, & \text{otherwise.} \end{cases} \quad (12)$$

$$A_{max}(i, l, k, c) \triangleq \begin{cases} \max_{t,p,q} \frac{|v(i, l, c, t, p, q, k)|}{\chi(i, l, k, t, p, q)}, & \text{if } F_N \text{ is on} \\ \max_{t,p,q} |v(i, l, c, t, p, q, k)|, & \text{otherwise.} \end{cases} \quad (13)$$

(d) The $K_{non}$·C angle intervals $[\theta_{min}(i, l, c, k), \theta_{max}(i, l, c, k)]$, for $k=K_{iso}, \ldots, K-1$, given by:

$$\theta_{min}(i, l, k, c) \triangleq \quad (14)$$
$$\min_{t,p,q}\left[phase\{v(i, l, c, t, p, q, k)\} - \frac{2\pi t}{T}\right] / (k - K_{iso} + 1),$$

$$\theta_{max}(i, l, k, c) \triangleq \quad (15)$$
$$\max_{t,p,q}\left[phase\{v(i, l, c, t, p, q, k)\} - \frac{2\pi t}{T}\right] / (k - K_{iso} + 1),$$

After the template parameters have been calculated, the template parameter computer 38 writes a parameter file. The parameter file may then be stored in the storage unit 34 of the training unit 20. The parameter file is provided to the image detection unit 22 of the system 10 via the read-only device 30, which is accessible by the detection module 24 for an on-line image detection operation. The parameter file should contain the following information.

(A) The input parameters.

(B) The coefficients of the K selected kernels. Alternatively, if universal kernels are used, then writing their coefficients in the parameter file can be avoided, as long as the detection module 24 is provided with the coefficients by some other means, e.g., by a ROM module (not shown) included in the system 10.

(C) The intervals. Specifically, for $i=0, \ldots, I-1$ and $l=0, \ldots, L-1$:

(i) Only if $F_N$ is on, the intensity intervals $[\chi_{min}(i, l, k), \chi_{max}(i, l, k)]$, for $k=0, \ldots, K-1$.

(ii) The color intervals $[A_{min}(i, l, c, k), A_{max}(i, l, c, k)]$, for $c=0, \ldots, C-1$ and $k=0, \ldots, K-1$.

(iii) The angle intervals $[\theta_{min}(i, l, c, k), \theta_{max}(i, l, c, k)]$, for $c=0, \ldots, C-1$ and $k=K_{iso}, \ldots, K-1$.

(D) The document parameters, which are presented in the table below.

| Parameter | Description |
|---|---|
| $D_i$ | Distance between the centers of the first two templates within the restricted document i ($\text{dist}\{s_{n0}, s_{n1}\}$, for $s_{n0}, s_{n1} \in \tau_i$). |
| $\alpha_i$ | The angle between the vector $(s_{n1}-s_{n0})$ and the (canonical) horizontal axis. |
| $\{p_i(l)\}_{l=2}^{L-1}$ | The document-coordinates of the centers of all the templates selected for document i (except the first two). |

Document-coordinates are coordinates of a given point within a restricted-document image, related to a 2D coordinate system defined by the first two templates selected for that document ($S_{n0}, S_{n1} \in \tau_i$). This basis sets $s_{n0}$ as the origin, and the vector $s_{n1}-s_{n0}$ as the first axis direction. The document-coordinates of the templates within each document (except for the first two) are written to the parameters file. This representation permits an efficient performance of a geometric verification step of the on-line image detection procedure, which will be described below with reference to the detection module 24 of the image detection unit 22.

Preferably, each interval is increased in order to reduce mis-detections during the on-line image detection procedure. Good results were produced when the color, intensity and angle intervals were increased to approximately their mid-points, in the following manner.

(a) For color interval:

$$*[A_{min}(i, l, c, k=0)-0.035, A_{max}(i, l, c, k=0)+0.035].$$

$$*[A_{min}(i, l, c, k\neq0)-0.08, A_{max}(i, l, c, k\neq0)+0.08].$$

(b) For intensity interval:

$$*[\chi_{min}(i, l, k=0)-\Delta\chi_{min}, \chi_{max}(i, l, k=0)-\Delta\chi_{max}],$$

where
$\Delta\chi_{min}=\max(100, \chi_{min}(i, l, k=0)/4),$
$\Delta\chi_{max}=\max(100, 2\chi_{max}(i, l, k=0)).$ $$*[\chi_{min}(i, l, k\neq0)-\Delta\chi_{min}, \chi_{max}(i, l, k\neq0)-\Delta\chi_{max}],$$

where
$\Delta\chi_{min}=\max(20, 0.4\chi_{min}(i, l, k\neq0)),$
$\Delta\chi_{max}=\max(20, 3\chi_{max}(i, l, k\neq0)).$ (c) For angle intervals:

$$*[0.95\theta_{min}(i, l<2, c, k), 1.05\theta_{max}(i, l<2, c, k)].$$

$$*[0.92\theta_{min}(i, l\geq2, c, k), 1.08\theta_{max}(i, l\geq2, c, k)].$$

After the parameter file has been written by the template parameter computer 38 and stored in the storage unit 34, the training procedure is completed. The training procedure need only be executed once, unless additional restricted-document images are to be considered by the counterfeit protection system 10.

Figure 4:
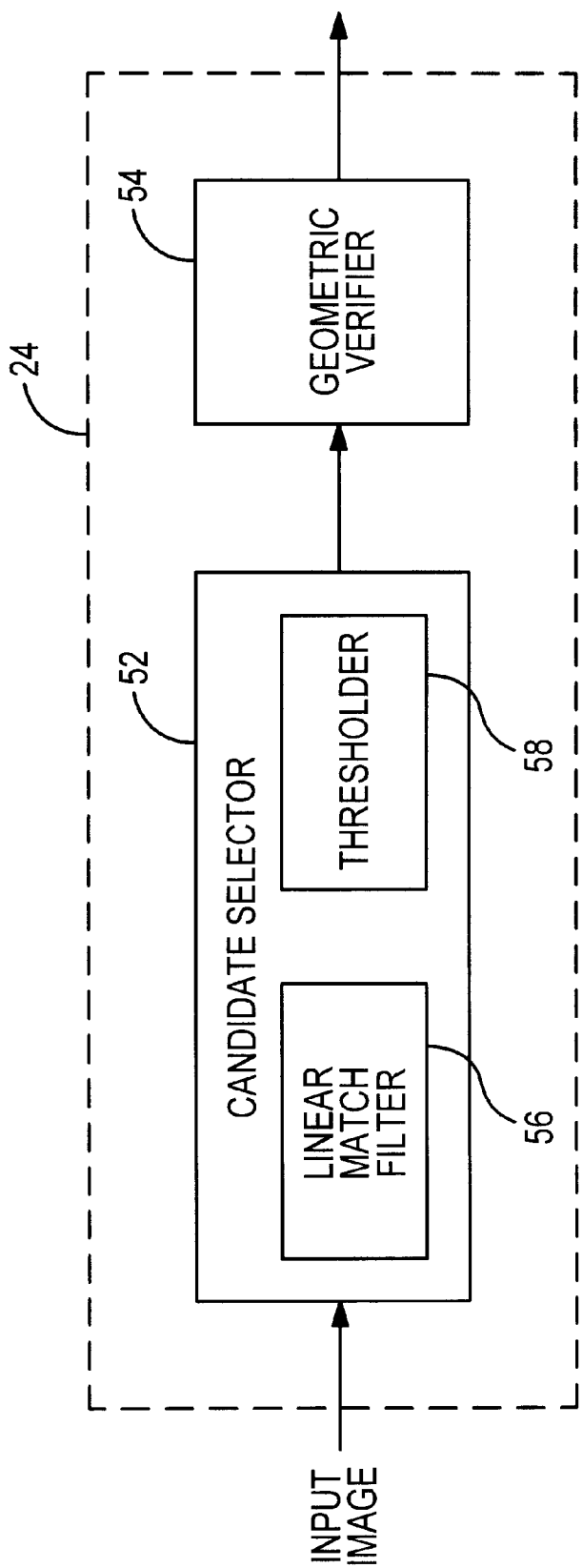
FIG. 4 is a block diagram of the components of a detection module included in the counterfeit protection system of FIG. 1.

The on-line image detection procedure is executed by the detection module 24 of the image detection unit 22. The detection module operates to analyze an input image and determine whether the input image matches, i.e., closely resembles, any of the restricted-document images that were processed by the training unit 20 during the off-line training procedure. The detection module includes a candidate selector 52 and a geometric verifier 54, as shown in FIG. 4.

The candidate selector 52 of the detection module 34 receives as inputs the parameter file stored in the read-only device 30 and an image that is to be examined by the counterfeit protection system 10. The input image is assumed to be at a resolution $R_0/R$, where $R_0$ and $R$ are given in the parameter file. Alternatively, the input image can be given at a higher resolution, which would require the candidate selector to first downscale the input image to the resolution $R_0/R$. The output of the candidate selector is a list of coordinates within the input image that correspond to the locations of possible occurrences of template matches. This list also presents the corresponding restricted-document images and template numbers, as well as its estimated orientation angle interval.

The candidate selection procedure is described in the following C-like pseudo-codes. Below is the C-like pseudo-code for the candidate selection algorithm.

```
L = candidate_selection(x, parameters_file) {
    /* The resolution of the input image x is assumed to be R₀/R. */
    Let L be the output list of candidates. Initially, L is empty.
    h ← Height of x; w ← Width of x;
    for (m = 0; m < h; m++)
    for (n = 0; n < w; n++) {
        if (F_M) loc_max ← 'Unknown';
        pass ← 'true';
        v[k][c] ← 'null', for k = 0,..., K − 1 and c = 0,..., C − 1.
        for (i =0; (i<I) and (loc_max≠'false'); i++)
        for (l=0; (l<L) and (loc_max≠'false'); l++) {
            pass ← check_intervals (v, A_min, A_max, X_min, X_max);
            /* Described below */
            if ((pass) and (F_M) and (loc_max == 'Unknown')) {
                pass ← check_local_maximum (m,n);
                local_max ← (pass ? 'true' : 'false');
            }
            if (pass) {
                Δγ ← estimate_orientation_interval (v, θ_min, θ_max);
                /* Described below. */
                Add to L: (i, l, m, n, Δγ);
            }
        }
    }
}
```

Below is the C-like pseudo-code for an interval checking routine that is used in the candidate selection algorithm.

```
pass = check_intervals (v, A_min, A_max, χ_min, χ_max) {
    pass ← 'true';
    for (k = 0; (k < K) and (pass); k++) {
        if (v[k][0] = ='null')
            {v[k][c]}_{c=0}^{C−1} ← calculate_values (x, m, n, φ_k);
        /* Described below. */
        for (c = 0; (c < C) and (pass); c++)
            pass ← (A_min(i, l, k, c) ≤
                    v[k][c] ≤ A_max(i, l, k, c) ? 'true':'false');
        if ((F_N = = 'On') and (pass)) {
            χ[k] ← Σ_{c=0}^{C−1} |v[k][c]|;
            pass ← (χ_min(i, l, k) ≤ χ[k] ≤
                    χ_max(i, l, k) ? 'true':'false'));
        }
    }
    return pass;
}
```

Below is the C-like pseudo-code for value calculation that is used in the interval checking routine.

```
{v[k][c]}_{c=0}^{C−1} = calculate_values (x, m, n, φ_k) {
    for (c = 0;c < C;c++) {
        v[k][c] ← The inner product between φ_k and the
                  N × N block centered at (m, n), in the color-plane c of x;
    }
    if (F_N)
        for (c = 0; c < C;c++) {
            v[k][c] ← v[k][c] / (Σ_{c=0}^{C−1} |v[k][c]|);
        }
    return {v[k][c]}_{c=0}^{C−1}.
}
```

Below is the C-like pseudo-code for estimation of the orientation interval that is used in the interval checking routine.

```
Δγ = estimate_orientation_interval (v, θ_min, θ_max) {
    k_0 ← K_iso;
    c_0 ← Color plane c with minimum interval θ_max[k_0][c]−
          θ_min[k_0][c];
    γ_max ← phase {v[k_0][c_0]} −
            θ_min[k_0][c_0];
    γ_min ← phase {v[k_0][c_0]} −
            θ_max[k_0][c_0];
    return Δγ = [γ_min, γ_max];
}
```

For each position (n, m) within the input image, the candidate selector 52 operates to check an N×N block centered at (n, m) to determine whether that block is a template match candidate. This determination is executed in the following manner. The color planes (indexed by c) of the block are projected (by inner product) on the isotropic and non-isotropic kernels (indexed by k) by a linear match filter 56 of the candidate selector, resulting in the projection values v[k][c](m, n). These values are then compared with the interval thresholds by a thresholder 58 of the candidate selector for all restricted-document images i=0, . . . , I−1 and their templates l=0, . . . , L−1, which were provided in the parameter file. First, the color intervals $[A_{min}, A_{max}]$ are checked, and then the intensity intervals $[\chi_{min}, \chi_{max}]$ are checked, if the normalization flag $F_N$ is on. If the local-maximum flag $F_M$ is on, then the thresholder 58 of the candidate selector 52 also checks to determine whether the block corresponds to a local maximum of the energy function e:

$$e(m, n) = \sum_{c=0}^{C-1} \sum_{k=0}^{K-1} |v[k][c](m, n)|^2. \quad (16)$$

If the block passes all the above tests for a certain pair of (i, l) parameters, then the block is considered a template match candidate. In this case, the block orientation interval $\Delta\gamma$ is estimated, and the match parameters i, l, m, n and $\Delta\gamma$ are added to the match list $\mathscr{L}$. This list is then passed to the geometric verifier 54 of the detection module 24.

In order to save computations, the interval checks are performed in a pipelined way. The color check for a kernel k is performed only if the color check for the previous kernel k−1 has passed. For example, the color check for the kernel k=1 is performed only if the color check for the kernel k=0 has passed. The intensity check is performed only if the block passed all the color checks. Similar to the color check, the intensity check is executed in the same pipelined manner. Finally, the local-maximum test is performed only if all the previous tests were positive. The described method is defined herein as a rejection approach.

The whole image x need not be analyzed by the candidate selector 52 before the list $\mathscr{L}$ is passed to the geometric verifier 54. In a preferred implementation, updates to the list $\mathscr{L}$ can be passed immediately to the geometric verifier after each new line of the input image x is processed by the candidate selector in a pipelined manner.

The following are practical considerations for the operation of the candidate selector 52 of the detection module 24.

(A) The projected values $\{v[k][c]\}$ have to be compared to the intervals corresponding to every image i and template l, but $v[k][c]$ does not depend on i and l. This means that the projected values have to be calculated only once for each location (m, n). The pseudo-code for the candidate selection, described above, pays special attention to this.

(B) Similarly, the local-maximum test has to be performed only once for each location, i.e., only if the loc_max variable is still set to 'Unknown.' Moreover, if the result of the test is negative (loc_max←'false'), then the algorithm immediately moves to the next location (m,n), since local-maximum is a requirement that does not depend on i or l.

(C) In the C-like pseudo-code for estimation of the orientation interval, the orientation is calculated based on the first non-isotropic ($k=K_{iso}$) kernel only. Alternatively, the values for other non-isotropic kernels could be taken into account. However, special attention should be paid to the spectrum compression corresponding to the division by ($k-K_{iso}+1$) in the calculations (14) and (15).

The geometric verifier 54 of the detection module 24 performs the final procedure in order to verify the template matches that were identified by the candidate selector 52. The geometric verifier looks for combinations of $L_e$ (defined by the input parameters) template candidates in the list $\mathscr{L}$ that satisfy the following requirements.

(A) All the $L_e$ candidates correspond to the same restricted document i.

(B) The $L_e$ candidates have different template numbers l. The two first templates l=0 and l=1 have to be present.

(C) The distance between the two first templates (the position of each given by m and n) should approximately match the document parameter $D_i$.

(D) The document-coordinates of the templates with l≧2 should match those given in the parameter file ($\{p_i(l)\}$).

(E) The orientation of the scanned restricted documents should match that of all the templates. Specifically, it should belong to the orientation interval [$\gamma_{min}$, $\gamma_{max}$] of all the $L_e$ templates.

If a set of $L_e$ candidates in the list $\mathscr{L}$ satisfies the above requirements, then this set is declared a document occurrence by the geometric verifier 54, which means that the input image matches one of the restricted-document images. The list of document occurrences O is the final output of the on-line image detection procedure. Alternatively, a subsequent verification could be performed before outputting the list, in order to remove multiple detections. That is, if two detected restricted documents are too close, they are merged into a single detection.

The below C-like pseudo-code describes the geometric verification procedure that is executed by the geometric verifier 54 of the detection module 24.

```
O = geometric_verification (L, parameters_file) {
    for (all candidates s ∈ L with l == 0)
        for (all candidates r ∈ L with l == 1 and l[r] == l[s])
            if(|dist(s, r) − D_i|≦T_D) {
                γ_i = calc_orientation (r, s, α_i);
                /* Described below. */
                if(γ_i∈ Δγ[s])
                if(γ_i∈ Δγ[r]) {
                    Template_count←2;
                    for (all candidates q ∈ L with l>1 and l[q]== l[s]) {
                        Check position of q in relation to the
                            document-coordinates p_i(l).
                        if((position offset ≦ T_p) and (γ_i ∈ Δγ[q]))
                            Template_count++;
                    }
                    if(Template_count≧L_e)
                        Add occurrence (s, r) to O.
                }
            }
}
```

The calc_orientation routine used in the above code is described in the following C-like pseudo-code for the calculation of the image orientation.

```
γ_i = calc_orientation(s, r, α_i) {
    result ← atan2(m[s]− m[r], n[r]) − α_i;
    return result;
}
```

Practical considerations for the geometric verification procedure includes the fact that the positions (m, n) in $\mathscr{L}$ are given in the canonical coordinates of the input image, whereas the document parameters $p_i(l)$ are given in document-coordinates. In order to compare these coordinates, as required by the geometric_verification routine, either set of coordinates has to be converted to the other coordinate system. The preferred approach is to convert the positions $p_i(l)$ to the canonical input image coordinate system. This is required only once for each pair (s, r), which saves computations, as compared to the alternative of converting the positions (m, n) to the document-coordinates for each image i. In the geometric_verification routine, the preferred values for $T_D$ and $T_P$ are one.

The image detection scheme executed by the training unit and the counterfeit protection system allows the images to be processed at very low resolution, although there is no requirement for the scheme to work on low resolution. The working resolution can be adjusted by setting a different parameter value of R (e.g., 3 or 1 instead of 7). With the preferred parameters, the working resolution is about 7 dpi, which is extremely low. Images are usually displayed with approximately 100 dpi, and printed with more than 300 dpi.

Since the image has a very small number of pixels at the resolution of 7 dpi, a small amount of data needs to be processed. In addition, the ability to operate at such resolution levels, the scheme is allowed to operate using small kernels (7×7 pixel kernels for the preferred parameters). In practice, the low working resolution and the use of small kernels translate into low memory usage and high speed execution.

Working on low resolution also provides the following advantages. The algorithm is robust to slight degradations, such as pen scribbling or visible folds on the restricted-document, since these degradations are not noticeable at very low resolution. Moreover, the algorithm detects images that "resemble" a restricted-document at low resolution, even if it is not "exactly" an image of a restricted-document. This is advantageous since some counterfeiters may try to pass off a fake note that is not an exact duplicate of a monetary bill. For example, a dollar bill that contains the number "10" instead of "1" or contains the picture of a wrong president. Such fake note might not be detected by an algorithm that operates at a high resolution, since it will not be recognized as a counterfeit bill.

Figure 5:
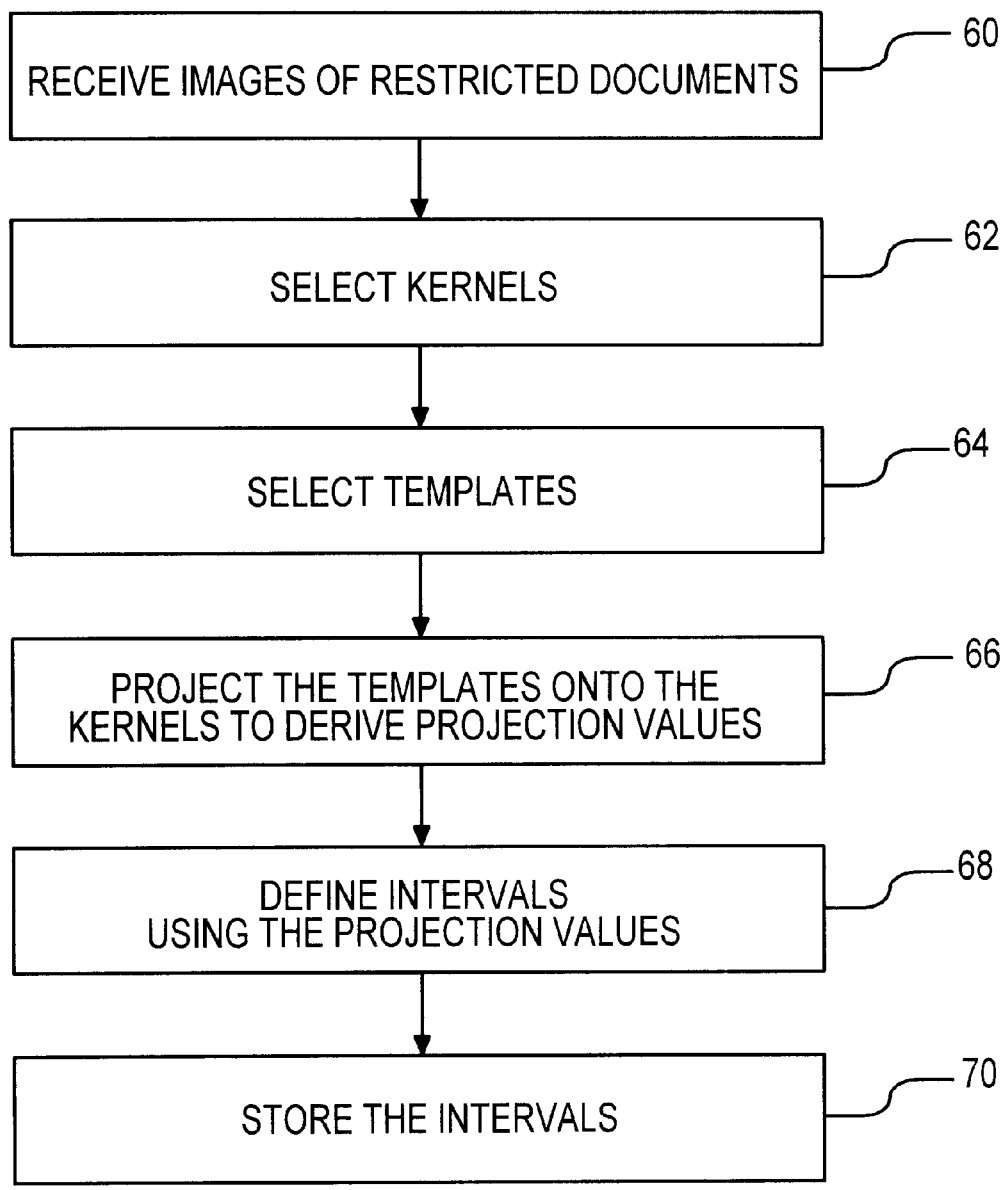
FIG. 5 is a flow diagram of an off-line training procedure executed by the training module of FIG. 3.
Figure 6:
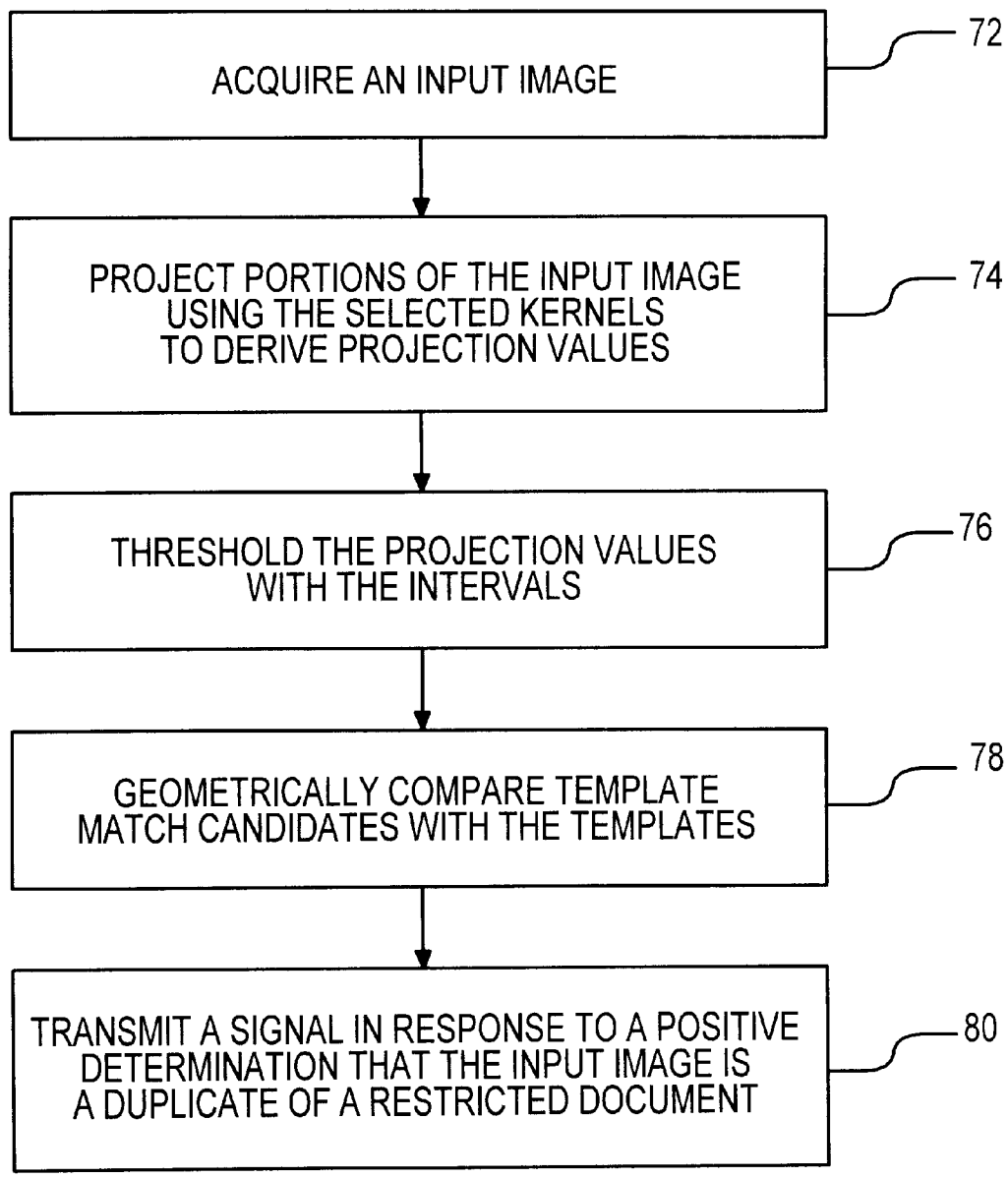
FIG. 6 is a flow diagram of an on-line image detection procedure primarily executed by the detection module of FIG. 4.

A method of detecting counterfeiting activities in accordance with the present invention will be described with reference to FIGS. 5 and 6. FIG. 5 shows a flow diagram for an off-line training procedure, while FIG. 6 shows a flow diagram for an on-line detection procedure. The off-line procedure will be described first.

The off-line procedure begins at step 60 of FIG. 5, during which images of restricted documents are received by the training module 32 of the training unit 20. During steps 62 and 64, kernels and templates are selected by the kernel selector 40 and the template selector 42 of the training module. The selected kernels preferably have a rotation-invariant convolution characteristic. The order of steps 62 and 64 may vary, depending on the input parameters $S_k$ and $S_t$. In fact, steps 62 and 64 may be executed in an alternative fashion and repeated. Such is the case if customized kernels and kernel-dependent templates are being selected. Furthermore, the input parameters $S_k$ and $S_t$ will control the type of kernels and templates that will be selected. The selected kernels and templates are then used to derive template parameters, during steps 66–68. First, the templates of the restricted documents are projected onto the kernels to derive projection values that relate to image characteristics of the templates, during step 66. The projection values are then used to define intervals of projection values, i.e., the template parameters, during step 68. The defined intervals may be stored in the storage unit 34 of the training unit 20, during step 70.

The online image detection procedure begins at step 72 of FIG. 6, during which an input image is acquired by the detection module 24 of the image detection unit 22. The manner in which the input image is acquired will depend on the host device embodying the counterfeit protection system 10. As an example, if the host device is a copy machine, the input image may be an image of an original document that is being copied. During step 74, portions of the input image are projected by the linear match filter 56 of the candidate selector 52 using the kernels selected during the off-line training procedure. The resulting projection values are then thresholded with the intervals, defined during the off-line procedure, by the thresholder 58 of the candidate selector, during step 76. If the resulting projection values of a particular portion of the input image lie within all the appropriate intervals, that particular portion is considered a template match candidate. The coordinates of the template match candidates are transmitted to the geometric verifier 54 of the detection module. During step 78, the template match candidates are geometrically compared with the templates by the geometric verifier to determine whether the input image is a duplicate of a specific restricted document. If it is determined that the input image is a duplicate of a restricted document, a signal is then transmitted to an appropriate destination, during step 80. As an example, the signal may be transmitted to a component within the host device in order to prevent the host device from printing a faithful reproduction of the input image. As another example, the signal may be transmitted to an off-device security site to record the activity as a potential counterfeit attempt.

What is claimed is:

1. A system for counterfeit protection comprising:
a host apparatus that processes an acquired input image;
training means for deriving parameters from a plurality of templates and kernels, said templates being selected portions of a restricted-document image, said kernels having a rotation-invariant convolution characteristic;
detecting means operatively coupled to said training means for determining whether said input image resembles said restricted-document image by utilizing said parameters, said detecting means being configured to compare relative positions of at least two template match candidates in said input image with relative positions of corresponding templates in said restricted-document image, each of said template match candidates being a portion of said input image that is preliminarily determined to correlate with one of said templates of said restricted-document image; and
signaling means operatively coupled to said detecting means for transmitting a signal when a positive determination is made by said detecting means that said input image closely resembles said restricted-document image.

2. The system of claim 1 wherein said comparing means is configured to compare relative coordinates of said template candidates in said input image with relative coordinates of said corresponding templates in said restricted-document image.

3. The system of claim 1 wherein said training means includes a processor for calculating said parameters from said plurality of said templates and kernels, said parameters being intervals of values that relate to an image characteristic of said templates.

4. The system of claim 1 wherein said training means includes a kernel selector and a template selector, said kernel and templates selectors being configured to select said kernels and said templates, respectively.

5. The system of claim 4 wherein said kernel selector of said training means is configured to select one of universal kernels and customized kernels, said universal kernels being independent of said templates, said customized kernels being dependent on said templates.

6. The system of claim 4 wherein said template selector of said training means is configured to select one of kernel-dependent templates and kernel-independent templates.

7. The system of claim 1 wherein said detecting means includes a linear match filter that operates to perform a convolution on said input image to produce projection values, said projection values being used to determine whether a particular portion of said input image is a template match candidate, said template match candidate being a portion of said input image that is preliminarily determined to correlate with one of said templates of said restricted-document image.

8. The system of claim 7 wherein said detecting means further includes a thresholder, said thresholder being configured to compare an image characteristic value of said particular portion of said input image with a corresponding parameter derived by said training means, said image characteristic value being related to said projection values produced by said linear match filter.

9. The system of claim 1 wherein said host apparatus being one of a copy machine, a scanner, a printer and a computer, said input image being a scanned image of a document generated by said host apparatus.

10. A method of detecting counterfeiting activities comprising steps of:

receiving an input image;

projecting portions of said input image with predefined kernels to produce projection values relating to at least one image characteristic, said predefined kernels having a rotation-invariant convolution property;

thresholding said projection values with predefined values that relate to said at least one image characteristic of a restricted-document image, so as to select template match candidates from said portions of said input image, said template match candidates being image portions of said input image that resemble at least one of templates of said restricted-document image;

comparing relative positions of said template match candidates in said input image with relative positions of corresponding templates in said restricted-document image to determine whether said input image is a duplicate of said restricted-document image; and transmitting a signal when a determination is made that said input image is a duplicate of said restricted-document image.

11. The method of claim 10 further comprising steps of:

selecting said predefined kernels having said rotation-invariant convolution property;

selecting said templates extracted from said restricted-document image; and computing said predefined values from said kernels and said templates.

12. The method of claim 11 wherein said step of selecting said predefined kernels includes a step of computing universal kernels, said universal kernels being independent of said templates.

13. The method of claim 11 wherein said step of selecting said templates includes a step of extracting said templates from said restricted-document image that are dependent on said predefined kernels.

14. The method of claim 11 wherein said step of computing said predefined values includes a step of defining an interval of values that relate to said at least one image characteristic of said templates of said restricted document.

15. The method of claim 10 further comprising a step of executing a preventive action in response to said signal in order to prevent counterfeiting of said restricted document.

16. A method of detecting counterfeiting activities comprising steps of:

deriving parameters from a plurality of templates and a plurality of kernels, said templates being selected portions of a restricted document that is to be protected from counterfeiting, said kernels having a rotation-invariant convolution characteristic; and determining whether an input image closely resembles said restricted document by correlating portions of said input image with said templates of said restricted document using said kernels to derive projection values, including comparing said projection values with said parameters, said comparison of said projection values with said parameters being a factor for said determination of whether said input image closely resembles said restricted document, said determining including geometrically comparing relative positions of template match candidates in said input image with relative positions of said templates in said restricted document, each of said template match candidates being a particular portion of said input image that is preliminarily determined to correlate with one of said templates of said restricted document.

17. The method of claim 16 wherein said step of deriving said parameters includes a step of defining at least one interval of values that relates to an image characteristic of said templates of said restricted document.

18. The method of claim 17 wherein said step of defining said at least one interval is a step of defining said values so as to relate to color, intensity and angular orientation.

19. The method of claim 17 wherein said step of comparing said projection values includes a step of thresholding an image characteristic value with said interval, said image characteristic value being related to said projection values derived from said portions of said input image.

20. The method of claim 16 further comprising steps of:

selecting said kernels that are used in said step of deriving said parameters; and selecting said templates that are used with said kernels in said step of deriving said parameters.

21. The method of claim 20 wherein said step of selecting said kernels includes a step of computing said kernels of a particular type selected from a group consisting of universal kernel and customized kernel, said universal kernels being independent of said templates, said customized kernels being dependent on said templates.

22. The method of claim 20 wherein said step of selecting said templates includes a step of extracting said templates from said restricted document, said templates being of a type selected from a group consisting of kernel-dependent templates and kernel-independent templates.

23. The method of claim 16 further comprising a step of transmitting a signal to a destination in response to a determination that said input image closely resembles said restricted document in order to prevent counterfeiting of said restricted document.

24. The method of claim 16 wherein said step of determining whether said input image closely resembles said restricted document is executed within an apparatus, said apparatus being one of a copy machine, a scanner, a printer and a computer.

* * * * *